US008775771B2

(12) United States Patent
Yeh et al.

(10) Patent No.: US 8,775,771 B2
(45) Date of Patent: Jul. 8, 2014

(54) BLOCK MANAGEMENT METHOD FOR A FLASH MEMORY AND FLASH MEMORY CONTROLLER AND STORAGE SYSTEM USING THE SAME

(75) Inventors: Chih-Kang Yeh, Kinmen County (TW); Cheng-Chi Hsieh, Taipei (TW)

(73) Assignee: Phison Electronics Corp., Miaoli (TW)

( * ) Notice: Subject to any disclaimer, the term of this patent is extended or adjusted under 35 U.S.C. 154(b) by 860 days.

(21) Appl. No.: 12/605,884

(22) Filed: Oct. 26, 2009

(65) Prior Publication Data
US 2011/0078363 A1 Mar. 31, 2011

(30) Foreign Application Priority Data
Sep. 30, 2009 (TW) .............................. 98133270 A

(51) Int. Cl.
*G06F 12/00* (2006.01)
*G06F 13/00* (2006.01)
*G06F 13/28* (2006.01)
*G06F 11/00* (2006.01)

(52) U.S. Cl.
USPC ........................................ 711/173; 714/6.13

(58) Field of Classification Search
None
See application file for complete search history.

(56) References Cited

U.S. PATENT DOCUMENTS

| 6,415,400 B1* | 7/2002 | Wu et al. ....................... 714/723 |
| 2008/0195799 A1* | 8/2008 | Park .............................. 711/103 |
| 2008/0307192 A1* | 12/2008 | Sinclair et al. ................ 711/218 |

FOREIGN PATENT DOCUMENTS

CN 101556555 10/2009

* cited by examiner

*Primary Examiner* — April Y Blair
*Assistant Examiner* — Gary W Cygiel
(74) *Attorney, Agent, or Firm* — J.C. Patents

(57) ABSTRACT

A block management method for managing a plurality of physical blocks of a flash memory chip is provided. The block management method includes configuring a plurality of logical addresses; mapping the logical addresses to a plurality of logical blocks; and mapping the logical blocks to the physical blocks. Additionally, the block management method also includes obtaining deleting records related to a plurality of deleted logical addresses from a host system, wherein data stored in the deleted logical addresses is recognized as invalid by the host system. And, the block management method further includes obtaining a deleted logical block, marking each of the logical addresses mapped to the deleted logical block as a bad logical address, and linking the physical block mapped to the deleted logical block to a spare area. Accordingly, the block management method can effectively prolong the lifespan of a flash memory chip.

18 Claims, 13 Drawing Sheets

BLOCK MANAGEMENT METHOD FOR A FLASH MEMORY AND FLASH MEMORY CONTROLLER AND STORAGE SYSTEM USING THE SAME

CROSS-REFERENCE TO RELATED APPLICATION

This application claims the priority benefit of Taiwan application serial no. 98133270, filed on Sep. 30, 2009. The entirety of the above-mentioned patent application is hereby incorporated by reference herein and made a part of this specification.

BACKGROUND

1. Technology Field

The present invention relates to a block management method for a flash memory and particularly to a block management method capable of prolonging the lifespan of a flash memory, and a flash memory storage system and a flash memory controller using the method.

2. Description of Related Art

Along with the widespread of digital cameras, cell phones, and MP3 in recently years, the consumers' demand to storage media has increased drastically. Flash memory has the characteristics of data non-volatility, low power consumption, compact size, and non-mechanical structure. Hence, flash memory is adapted for portable appliances, especially portable products powered by batteries. A solid state drive (SSD) is a storage device that uses a NAND flash memory as its storage medium. Flash memory has been widely-used for storing important personal data because it has a larger capacity and a smaller volume. For these reasons, flash memory has become an import part of the electronic industries.

Generally speaking, physical blocks of a flash memory chip in a flash memory storage device are logically grouped into a system area, a data area, a spare area, and a replacement area by a flash memory controller of the flash memory storage device. The physical blocks in the system area are configured to store important relevant information of the flash memory storage system. On the other hand, the physical blocks in the replacement area are configured to replace the damaged physical blocks in the data area or the spare area. Therefore, under a normal access mode, the host system can not access the physical blocks in the system area and the replacement area. The physical blocks grouped into the data area are configured to store valid data written by write commands while physical blocks in the spare area are configured to replace the physical blocks in the data area when the write commands are executed. To be specific, when a flash memory storage device receives a write command from a host system and accordingly is about to update (or write) data in a physical block in the data area, the flash memory storage device first selects a physical block from the spare area, then writes the old valid data in the physical block to be updated in the data area and the new data into the physical block selected from the spare area, logically links the physical block containing the new data to the data area, and eventually erases the physical block to be updated in the data area and logically links it to the spare area. In order to allow the host system to successfully access the physical blocks that are alternatively used to store data described above, the flash memory storage device provides logical blocks to the host system. Namely, the flash memory storage device reflects the substitution of the physical blocks by recording and updating the mappings between the logical blocks and the physical blocks in the data area in a logical address-physical address mapping table. Thus, the host system simply accesses a logical block while the flash memory storage device accesses the corresponding physical block according to the logical address-physical address mapping table.

However, the number of times of erasing the physical blocks of physical units is limited (for instance, the physical blocks will be damaged after ten thousand times of erasing). When one physical block is so highly programmed and erased and becomes damaged, the flash memory controller would mark the physical block which is damaged and stop to use it, and get a new physical block as substitute from the replacement area. In particular, when damaged physical blocks exceed a certain amount with a result that the number of physical blocks becomes insufficient for access of the host system, the flash memory storage device would enter a write protect status or be determined as useless. Thereby, how to prolong the lifespan of a flash memory storage device is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a block management method capable of effectively prolong the lifespan of a flash memory storage device.

The present invention is directed to a flash memory controller capable of effectively prolong the lifespan of a flash memory storage device.

The present invention is directed to a flash memory storage system capable of effectively prolong the lifespan of a flash memory storage device.

According to an exemplary embodiment of the present invention, a block management method for managing a plurality of physical blocks of a flash memory chip is provided. The block management method includes configuring a plurality of logical addresses; mapping the logical addresses to a plurality of logical blocks; and mapping the logical blocks to the physical blocks. The block management method also includes configuring a logical block-physical block mapping table to record mapping relationships between the logical blocks and the physical blocks. Additionally, the block management method also includes obtaining a deleting record from a host system, wherein the deleting record has information about deleted logical addresses among the logical addresses and data stored in the deleted logical addresses is recognized as invalid by the host system. And, the block management method further includes obtaining a deleted logical block and marking each of the logical addresses mapped to the deleted logical block as a bad logical address, wherein data stored in the logical addresses mapped to the deleted logical block is recognized as invalid by the host system and the host system is not allowed to access data in the bad logical address.

According to an exemplary embodiment of the present invention, a flash memory controller for managing a plurality of physical blocks of a flash memory chip is provided. The flash memory controller includes a microprocessor unit, a flash memory interface unit, a host interface unit, and a memory management unit. The flash memory interface unit is coupled to the microprocessor unit and configured to connect to the flash memory chip. The host interface unit is coupled to the microprocessor unit and configured to connect to a host system. The memory management unit is coupled to the microprocessor unit and configures a plurality of logical addresses. Here, the memory management unit maps the logical addresses to a plurality of logical blocks, maps the logical blocks to the physical blocks and configures a logical block-physical block mapping table to record mapping relationships between the logical blocks and the physical blocks. Additionally, the memory management unit obtains a deleting record from a host system via the host interface unit, wherein the deleting record has information about deleted logical addresses among the logical addresses and data stored in the deleted logical addresses is recognized as invalid by the host system. And, the memory management unit obtains a deleted logical block and marking each of the logical addresses mapped to the deleted logical block as a bad logical address, wherein data stored in the logical addresses corresponding the deleted logical block is recognized as invalid by the host system and the host system is not allowed to access data in the bad logical address.

According to an exemplary embodiment of the present invention, a flash memory storage system including a connector, a flash memory chip, and a flash memory controller is provided a flash memory has a plurality of physical blocks. The connector is configured to couple to a host system. The flash memory controller is coupled to the flash memory chip and the connector, and configures a plurality of logical addresses. Here, the flash memory controller maps the logical addresses to a plurality of logical blocks, maps the logical blocks to the physical blocks and configures a logical block-physical block mapping table to record mapping relationships between the logical blocks and the physical blocks. Additionally, the flash memory controller obtains a deleting record from a host system via the connector, wherein the deleting record has information about deleted logical addresses among the logical addresses and data stored in the deleted logical addresses is recognized as invalid by the host system. And, the flash memory controller obtains a deleted logical block and marking each of the logical addresses mapped to the deleted logical block as a bad logical address, wherein data stored in the logical addresses corresponding the deleted logical block is recognized as invalid by the host system and the host system is not allowed to access data in the bad logical address.

According to an exemplary embodiment of the present invention, a block management method for managing a plurality of physical blocks of a flash memory chip is provided. The block management method includes configuring a plurality of logical addresses and logically grouping the physical blocks into at least a data area and a spare area, wherein the physical blocks in the spare area are configured to substitute the physical blocks in the data area when a host write command is executed, and each of the logical addresses is mapped to one of the physical blocks in the data area. The block management method also includes marking at least one logical address mapped to the data area as at least one bad logical address, and linking the physical block mapped to the bad logical address to the spare area.

As described above, the block management method can effectively prolong the lifespan of a flash memory storage device.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
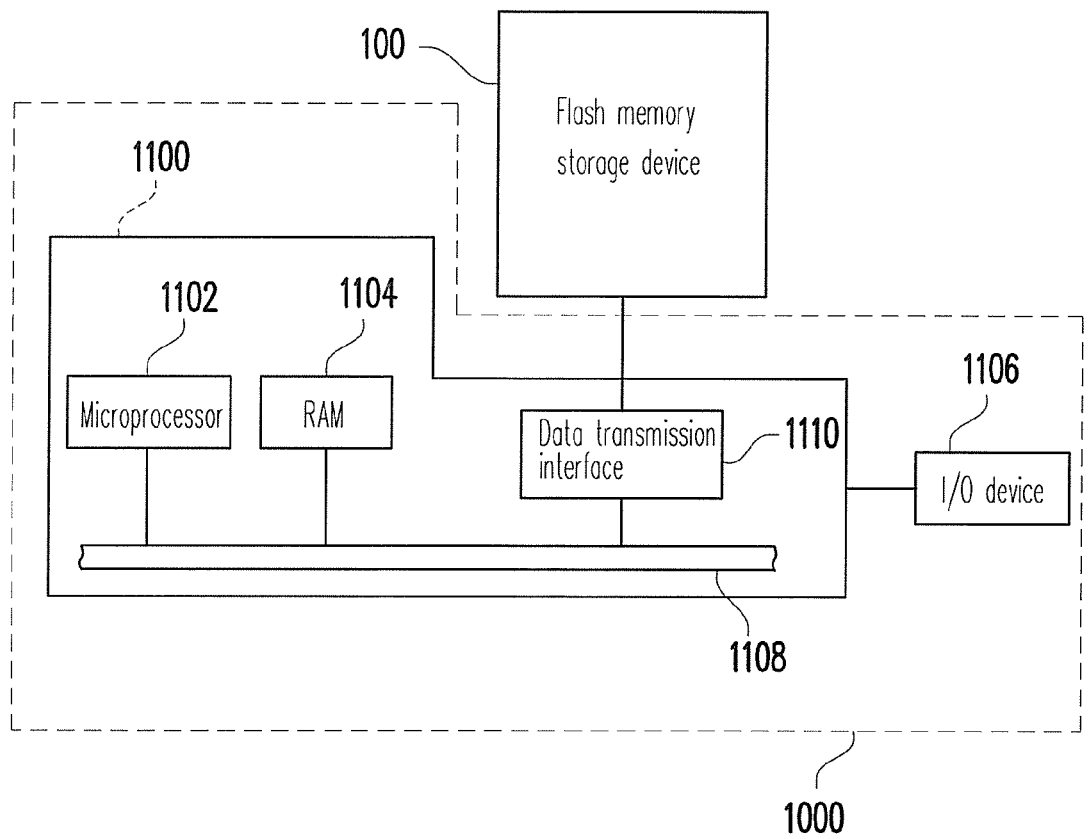
FIG. 1A is a schematic block diagram of a host system and a flash memory storage device according to a first exemplary embodiment of the present invention.

A flash memory storage device usually includes a flash memory chip and a controller (also referred to as a control circuit). The flash memory storage device is usually used together with a host system so that the host system can write data into or read data from the flash memory storage device. Besides, a flash memory storage device may also include an embedded flash memory and a software that can be executed by a host system and act as a controller of the embedded flash memory.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

FIG. 1A is a schematic block diagram of a host system and a flash memory storage device according to a first exemplary embodiment of the present invention.

Figure 1B:
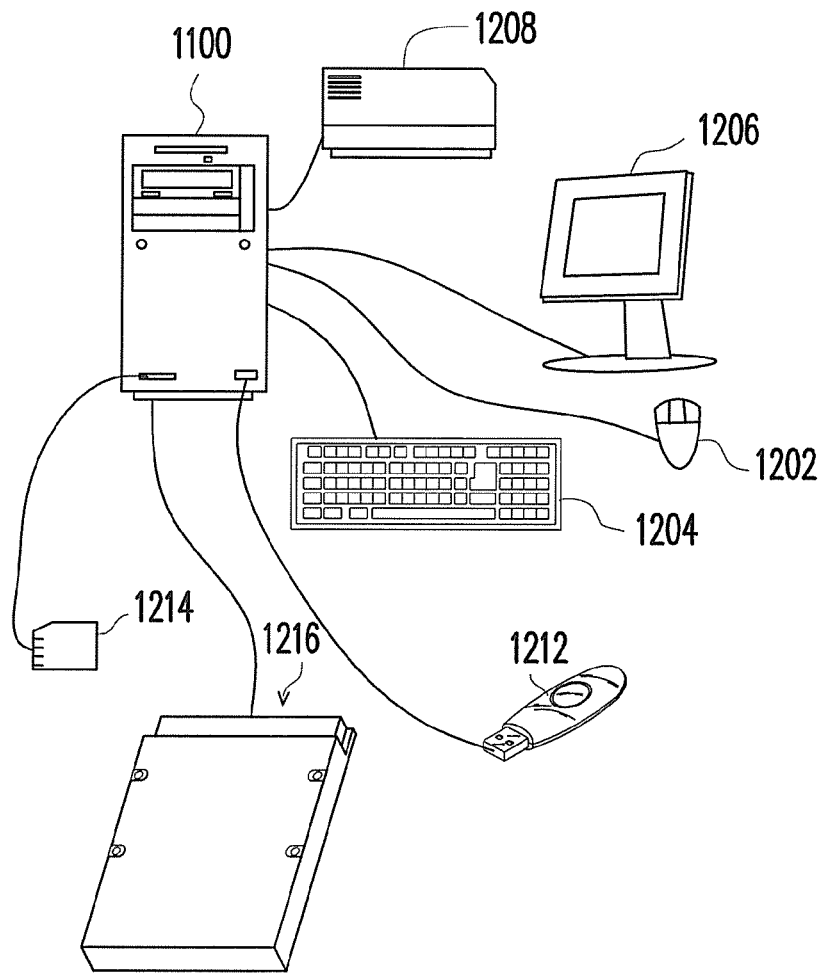
FIG. 1B is a diagram of a computer, an input/output device, and a flash memory storage device according to an exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 1B. It should be understood that the devices illustrated in FIG. 1B are not intended to limiting the I/O device 1106, and the I/O device 1106 may further include other devices.

In the present embodiment, the flash memory storage device 100 is coupled to other devices of the host system 1000 through the data transmission interface 1110. The host system 1000 writes data into or reads data from the flash memory storage device 100 through the operations of the microprocessor 1102, the RAM 1104, and the I/O device 1106. For example, the flash memory storage device 100 may be a flash drive 1212, a memory card 1214, or a solid state drive (SSD) 1216 as shown in FIG. 1B.

Figure 1C:
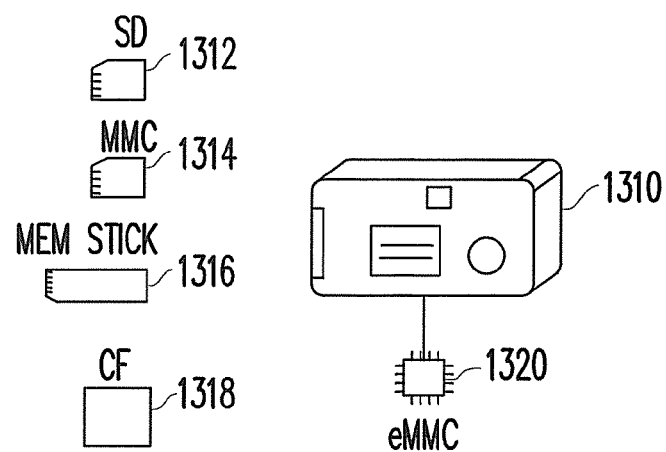
FIG. 1C is a diagram of a host system and a flash memory storage device according to another exemplary embodiment of the present invention.

Generally speaking, the host system 1000 may be any system for storing data. Even though the host system 1000 is described as a computer system in the present exemplary embodiment, in another exemplary embodiment of the present invention, the host system 1000 may be a digital camera, a video camera, a telecommunication device, an audio player, or a video player. For example, if the host system is a digital camera (video camera) 1310, the flash memory storage device is then a SD card 1312, a MMC card 1314, a CF card 1316 or a memory stick 1318 (as shown in FIG. 1C), or an embedded MMC (eMMC) 1320 configured in the digital camera 1310.

Figure 1D:
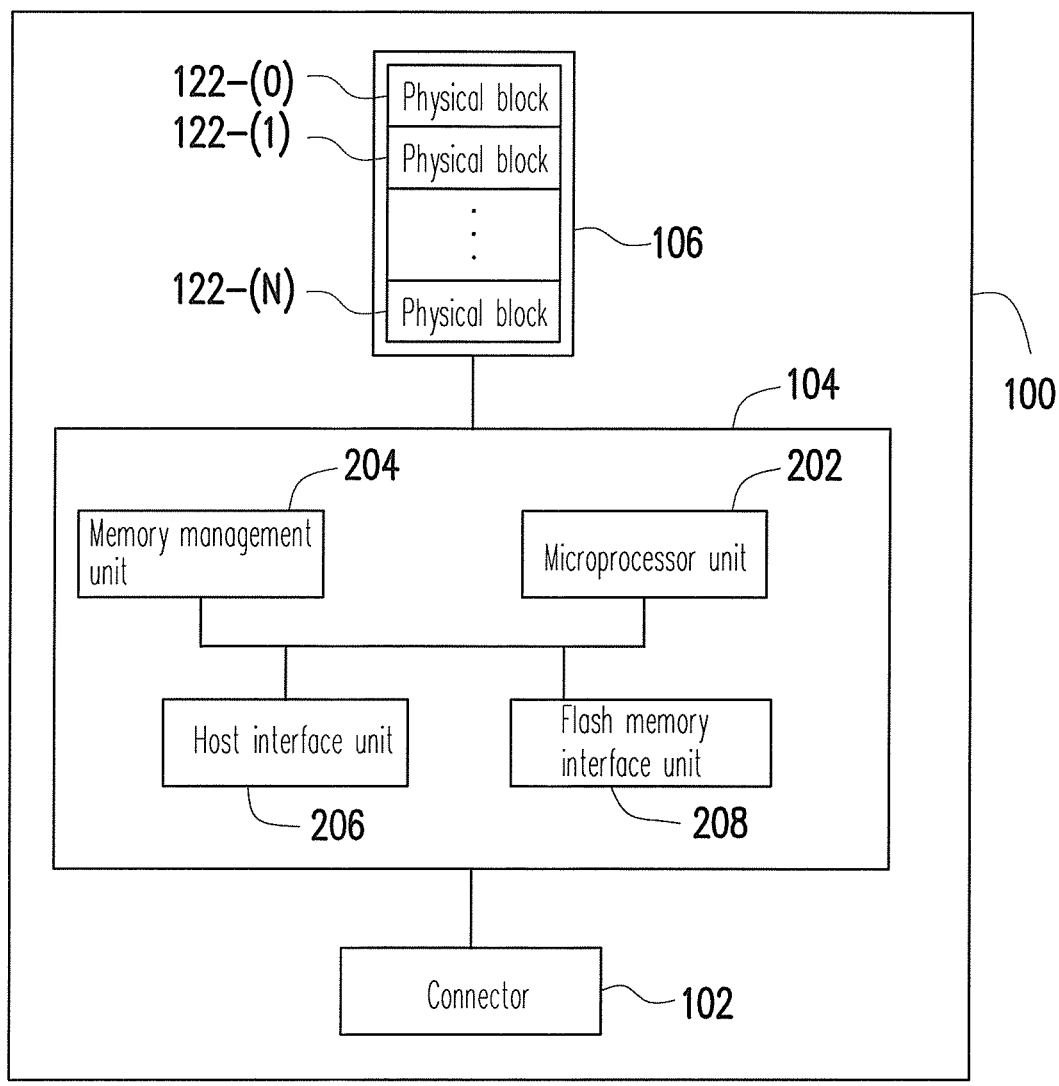
FIG. 1D is a detailed block diagram of the flash memory storage device in FIG. 1A.

FIG. 1D is a detailed block diagram of the flash memory storage device 100 in FIG. 1A.

Referring to FIG. 1D, the flash memory storage device 100 includes a connector 102, a flash memory controller 104, and a flash memory chip 106.

The connector 102 is coupled to the flash memory controller 104 and configured to connect to the host system 1000. In the present embodiment, the connector 102 is a serial advanced technology attachment (SATA) connector. However, the present invention is not limited thereto, and the connector 102 may also be a Parallel Advanced Technology Attachment (PATA) connector, a universal serial bus (USB) connector, an Institute of Electrical and Electronic Engineers (IEEE) 1394 connector, a peripheral component interconnect (PCI) express connector, a secure digital (SD) connector, a memory sick (MS) connector, a multi media card (MMC) connector, a compact flash (CF) connector, an integrated device electronics (IDE) connector, or other suitable connector.

The flash memory controller 104 executes a plurality of logic gates or control commands which are implemented in a hardware form or in a firmware foam, so as to perform operations of writing, reading or erasing data in the flash memory chip 106 according to the commands of the host system 1000. The flash memory controller 104 includes a microprocessor unit 202, a memory management unit 204, a host interface unit 206 and a flash memory interface unit 208.

The microprocessor unit 202 is the main control unit of the flash memory controller 104, and which cooperates with the memory management unit 204, the host interface unit 206, and the flash memory interface unit 208 to carry out various operations of the flash memory storage device 100.

The memory management unit 204 is coupled to the microprocessor unit 202, and executes a data reading/writing mechanism and a block management mechanism according to the present exemplary embodiment. Below, the operation of the memory management unit 204 will be described in detail with reference to accompanying drawings.

In the present exemplary embodiment, the memory management unit 204 is implemented in the flash memory controller 104 as a firmware form. For example, the memory management unit 204 including a plurality of control instructions is burned into a program memory (for example, a read only memory (ROM)), and the program memory is embedded into the flash memory controller 104. When the flash memory storage device 100 is in operation, the control instructions of the memory management unit 204 are executed by the microprocessor unit 202 to accomplish the block management mechanism and the data reading mechanism according to the present embodiment.

In another exemplary embodiment of the present invention, the control instructions of the memory management unit 204 may also be stored in a specific area (for example, the system area in a flash memory exclusively used for storing system data) of the flash memory chip 106 as program codes. Similarly, when the flash memory storage device 100 is in operation, the program instructions of the memory management unit 204 are executed by the microprocessor unit 202. In addition, in yet another exemplary embodiment of the present invention, the memory management unit 204 may also be implemented in the flash memory controller 104 in a hardware form.

The host interface unit 206 is coupled to the microprocessor unit 202 and configured to receive and identify commands and data received from the host system 1000. Namely, the commands and data sent by the host system 1000 are passed to the microprocessor unit 202 through the host interface unit 206. In the present exemplary embodiment, the host interface unit 206 is a SATA interface corresponding to the connector 204. However, it is to be understood that the present invention is not limited thereto, and the host interface unit 210 may also be a PATA interface, a USB interface, an IEEE 1394 interface, a PCI Express interface, a SD interface, an MS interface, an MMC interface, a CF interface, an IDE interface, or other suitable types of interfaces for data transmission.

The flash memory interface unit 208 is coupled to the microprocessor unit 202 and configured to access the flash memory chip 106. Namely, data to be written into the flash memory chip 106 is converted by the flash memory interface unit 208 into a format acceptable to the flash memory chip 106.

Figure 2:
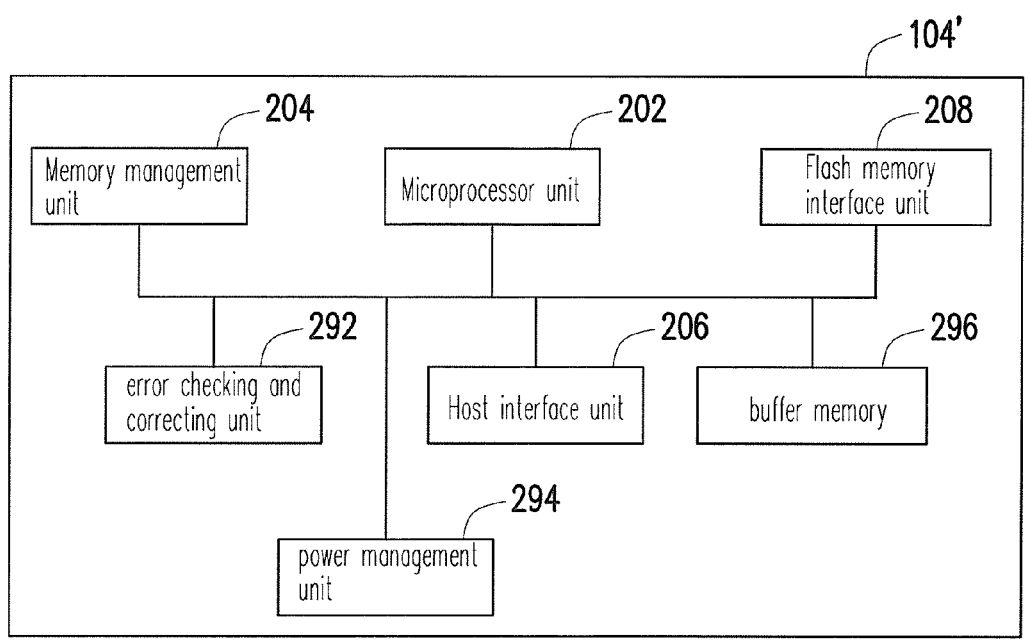
FIG. 2 is a schematic block diagram of a flash memory controller according to another exemplary embodiment of the present invention.

In addition, even though not described in the present exemplary embodiment, the flash memory controller may further include some general function modules FIG. 2 is a schematic block diagram of a flash memory controller according to another exemplary embodiment of the present invention.

Referring to FIG. 2, besides the microprocessor unit 202, the memory management unit 204, the host interface unit 206 and the flash memory interface unit 208, a flash memory controller 104' further includes an error checking and correcting unit 292, a power management unit 294 and a buffer memory 296.

The error checking and correcting unit 292 is coupled to the microprocessor unit 202 and configured to perform an error checking and correcting process to assure the accuracy of data. To be specific, when the memory management unit 204 receives a host write command from the host system 1000, the error checking and correcting unit 292 generates an error checking and correcting code (ECC code) corresponding to write date of the host write command, and the memory management unit 204 writes the write data and the ECC code into the flash memory chip 106. And, when the memory management unit 204 receives a host read command from the host system 1000, the memory management unit 204 reads data corresponding to the host read command and the ECC code corresponding the data, and the error checking and correcting unit 292 performs the error checking and correcting process to the read data based on the read ECC code corresponding to the read data.

The power management unit 294 is coupled to the microprocessor unit 202 and configured to control the power of the flash memory storage device 100.

The buffer memory 296 is coupled to the microprocessor unit 202 and configured to temporarily store data and commands from the host system 1000 or data from the flash memory chip 106.

The flash memory chip 106 is electrically coupled with the flash memory controller 104 for storing data. The flash memory chip 106 has a plurality of physical blocks 122-(0)~122-(N). Each of the physical blocks 122-(0)~122-(N) is the smallest erasing unit. That is, each of the physical blocks has a minimum number of memory cells for being erased altogether. Each physical block has several pages. In the present exemplary embodiment, each of the pages is the smallest programming unit. In other words, each page is the smallest unit for writing data or reading data. Each of the pages usually includes a user data area and a redundancy area. The data area is used to store user data, and the redundant area is used to store system data (for example, an error checking and correcting (ECC) Code). In the present exemplary embodiment, the flash memory chip 106 is a Multi Level Cell (MLC) NAND flash memory. However, the present invention is not limited thereto, and in another embodiment of the present invention, the flash memory chip 106 may also be a single level cell (SLC) NAND flash memory.

Figure 3A:
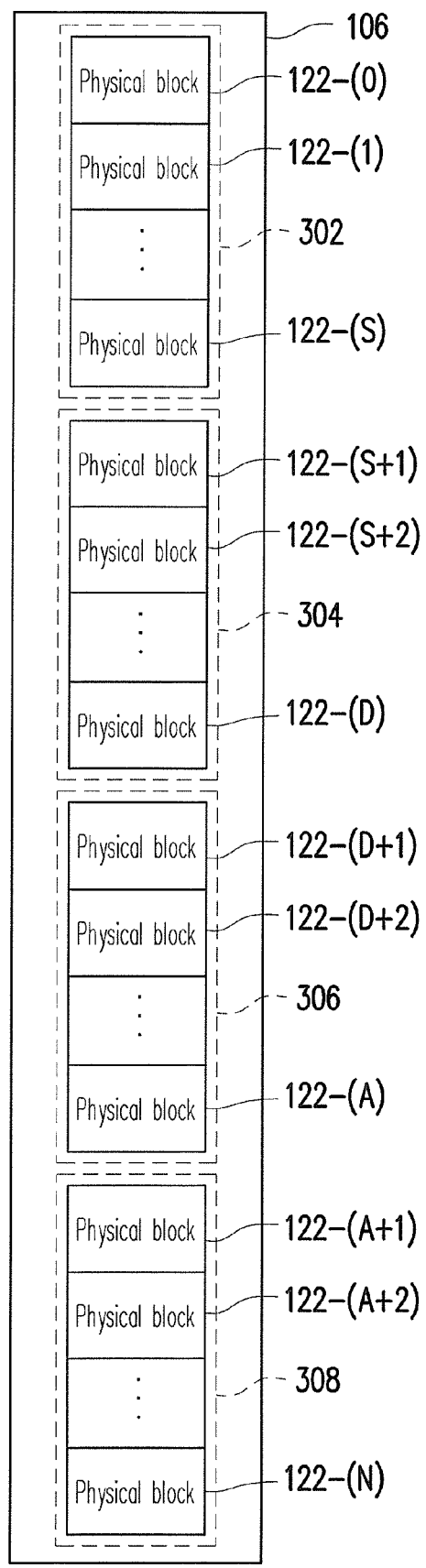
FIG. 3A is a schematic block diagram illustrating a flash memory chip according to a first exemplary embodiment of the present invention.

FIG. 3A is a schematic block diagram illustrating a flash memory chip according to a first exemplary embodiment of the present invention.

Referring to FIG. 3A, because the memory cells of the flash memory chip 106 only be programmed from "1" to "0", data in a physical block has to be erased before the physical block is updated. However, since data is written into a flash memory in unit of pages and is erased from the same in unit of physical blocks, the physical blocks in the flash memory chip 106 are alternatively used for storing data.

To be specific, the memory management unit 204 logically groups the physical units into a system area 302, a data area 304, a spare area 306, and a replacement area 308. The physical units in the system area 302 are used to store important information related to the flash memory storage device, and the physical units in the replacement area 308 are used to replace damaged physical units in the data area or the spare area. Therefore, in a normal mode, the host system 1000 can not access the physical blocks in the system area 302 and the replacement area 308. The physical blocks grouped into the data area 304 store valid data written by write commands while physical blocks in the spare area 306 are configured to substitute the physical blocks in the data area 304 when the write commands are executed. For example, when the flash memory storage device 100 receives a host write command from the host system 1000 and accordingly is about to update (or write data into) a specific page of a specific physical block in the data area 304, the memory management unit 204 selects a physical block from the spare area 306 and writes the old valid data in the physical block to be updated and the new data into the physical block selected from the spare area 306. Then, the physical block written with the old valid data and the new data is logically linked to the data area 304, and the physical block to be updated in the data area is erased and logically linked to the spare area 306.

In order to allow the host system 1000 to successfully access the physical blocks that are alternatively used to store data described above, the flash memory storage device 100 provides logical addresses and logical blocks corresponding to the logical addresses to the host system 1000 for accessing, and records a mapping relationship between the logical blocks and the physical blocks. That is, such as "select", "move", "replace", "substitute", "alternate", "group" and "link", for describing the operations of the physical blocks in a flash memory only refer to logical operations performed to these physical blocks. In other words, the actual positions of these physical blocks in the flash memory chip are not really changed. Instead, these physical blocks are only logically operated.

Figure 3B:
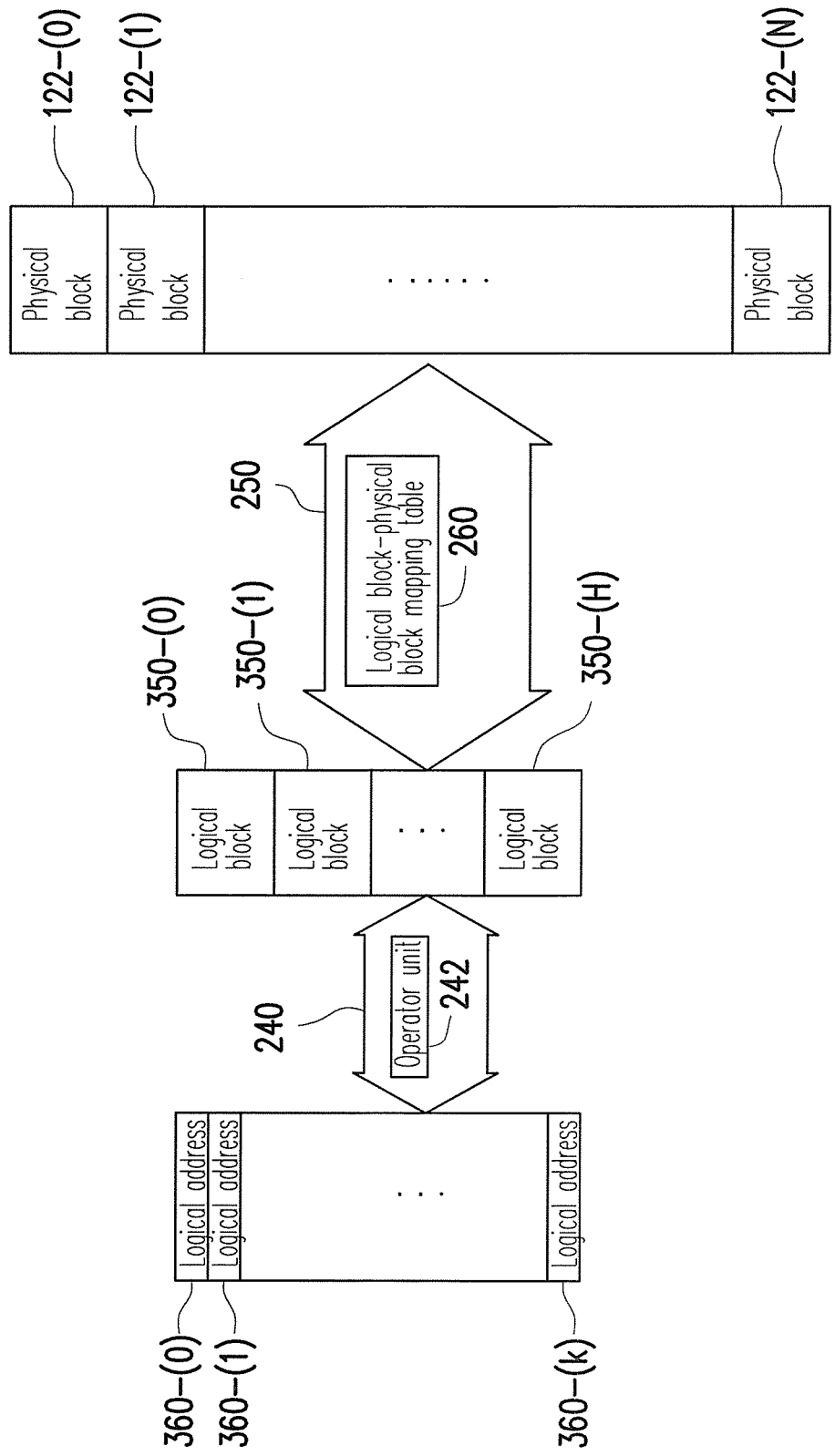
FIG. 3B is a schematic diagram illustrating operations of recording mapping relationships between logical blocks and physical blocks according to a first exemplary embodiment of the present invention.

FIG. 3B is a schematic diagram illustrating operations of recording mapping relationships between logical blocks and physical blocks according to a first exemplary embodiment of the present invention.

Referring to FIG. 3B, the flash memory controller 104 configures a plurality of logical addresses 360-(0)~306-(K), and provides a first transform layer 240 and a second transform layer 250 to map the logical addresses 360-(0)~306-(K) to logical blocks 350-(0)~350-(H) and map the logical blocks 350-(0)~350-(H) to the physical blocks 122-(0)~122-(N) of the flash memory chip 106, wherein each of these logical addresses 360-(0)~306-(K) corresponds to the access unit of the host system 1000 (such as one sector).

The first transform layer 240 has an operator unit 242 for mapping the logical addresses 360-(0)~306-(K) to the logical blocks 350-(0)~350-(H). For example, the operator unit 242 is a remainder operator, and the memory management unit 204 performs remainder operations to the serial numbers of the logical addresses through the operator unit 242, thereby the memory management unit 204 maps the logical addresses 360-(0)~306-(K) to the logical blocks 350-(0)~350-(H), wherein each of logical addresses 360-(0)~306-(K) is mapped to one of the logical blocks 350-(0)~350-(H). The second transform layer 250 has a logical block-physical block mapping table 260 for recording the mapping relationships between the logical blocks and the physical blocks.

To be specific, each of the logical blocks 350-(0)~350-(H) includes a plurality of logical pages, and each of the logical pages is composed of several logical addresses. Accordingly, when the host system 1000 accesses data at the logical addresses 360-(0)~360-(K), the flash memory controller 104 actually writes data into or read data from the physical block according to the logical block that the logical addresses 360-(0)~360-(K) belong to. For example, in a case where the logical address 360-(0) belongs to the logical block 350-(0) and the logical block 350-(0) is mapped to the physical block 122-(0), when the host system 1000 accesses data at the logical address 360-(0), the memory management unit 204 calculates that the logical block 350-(0) corresponding to the logical address 360-(0) through the first transform layer 240, and actually accesses data at the physical block 122-(0) according to the logical block-physical block mapping table 260 of the second transform layer 250.

Additionally, it should be mentioned that the logical block-physical block mapping table 260 is stored in the flash memory chip 106 (for example, the system area 302), and is loaded into the buffer memory 210 such that the memory management unit 204 reads and updates the logical block-physical block mapping table 260 when the flash memory storage device is operated. However, in a case where the storage space of the buffer memory 210 is smaller, the buffer memory 210 can not temporarily store the logical block-physical block mapping table 260 recording the mapping relationships related to all the logical blocks. Therefore, in another exemplary embodiment of the present invention, the memory management unit 204 groups the logical blocks as a plurality of logical zones, and configures logical block-physical block mapping tables for the logical zones, respectively. That is, each of the logical blocks belongs to one of the logical zones, and the memory management unit 204 records the mapping relationships of the logical blocks in the logical block-physical block mapping tables of the logical zones that the logical blocks belong to, respectively. In view of the above, when the host system 1000 is about to access a logical block, the memory management unit 204 loads the corresponding logical block-physical block mapping table into the buffer memory 210 from the flash memory chip 106 according to the logical zone that the logical block belongs to, and accesses data according to the loaded logical block-physical block mapping table. Then, when the host system 1000 is about to access another logical block, the memory management unit 204 stores the logical block-physical block mapping table back to the flash memory chip 106 and loads another logical block-physical block mapping table corresponding the another logical block into the buffer memory 210 from the flash memory chip 106. Accordingly, the problem that the buffer memory 210 is unable to store the mapping relationships related to all the logical blocks can be avoided.

As described above, when flash memory controller 104 executes a host write command from the host system 1000, the memory management unit 204 uses the physical blocks in the data area 304 and the spare area 306 in the alternate manner. In particular, in the exemplary embodiment of the present invention, when the physical blocks in the spare area have become as bad physical blocks or are not to be used normally (for example, data stored in the physical block has error bits or a program fail has occurred in the physical block) and there is no normal physical block in the replacement area 308, or the number of the bad physical blocks in the flash memory chip 106 is larger than a threshold (for example, the threshold is set as 80 percent of the number of the physical blocks originally belong to the spare area 306), the memory management unit 204 performs a block adjust mechanism to find a logical block which is not used by the host system 1000 or can be normally used and links the physical block mapping to the found logical block as the physical blocks to the spare area 306.

For example, in the file management mechanism of the operating system of the host system 1000, the operating system manages data stored in a storage device through a file allocation table, wherein in a case where the operating system deletes old data, the operating system only records the logical address stored the old data to be deleted is invalid to complete the deleting operation without actually deleting the old data. Then, when the operating system is about to write new data in the logical address which is recorded as invalid, the operating system directly write the new data into the logical address to overwrite the old data. It should be mentioned that when the operating system of the host system 1000 executes the deleting operation, the operating system transmits deleting records to inform the flash memory controller 104 in which logical addresses the data has been deleted (i.e. the aforementioned "which logical addresses" are deleted logical addresses in view of the host system 1000). Accordingly, the memory management unit 204 adjusts the logical blocks based on the deleting records. For example, in the exemplary embodiment of the present invention, the operating system of the host system 1000 is Microsoft Windows 7, and Microsoft Windows 7 transmits the deleting records through the trim command while the host interface unit 206 and the memory management unit are capable of recognizing the trim command. It should be mentioned that the present invention is not limited thereto, and in another embodiment of the present invention, other commands which can transmits the deleting records may be utilized in the present invention.

In particular, in the exemplary embodiment of the present invention, when the physical blocks in the spare area 308 have become as bad physical blocks or are not to be used normally and there is no normal physical block in the replacement area 308, the memory management unit 204 finds deleted logical blocks according to the deleting records in the received trim command, wherein all the data stored in the logical addresses mapping the deleted logical blocks is deleted or, in other words, recognized as invalid by the host system 1000. And the memory management unit 204 marks at least portion of the deleted logical blocks as bad logical blocks and forbids the host system 1000 using the bad logical blocks again. For example, the memory management unit 204 directly rewrites information in the file allocation table to mark the deleted logical block as the bad logical block, or the memory management unit 204 informs the deleted logical block is bad when the host system 1000 is about to write data into the deleted block and the host system 1000 rewrites information in the file allocation table to mark the deleted logical block as the bad logical block. Additionally, the memory management unit 204 updates the logical block-physical block mapping table 260, and links the physical blocks mapped to the bad logical blocks to the spare area 306, wherein the bad logical blocks would not be mapped to any physical block.

Figure 4A:
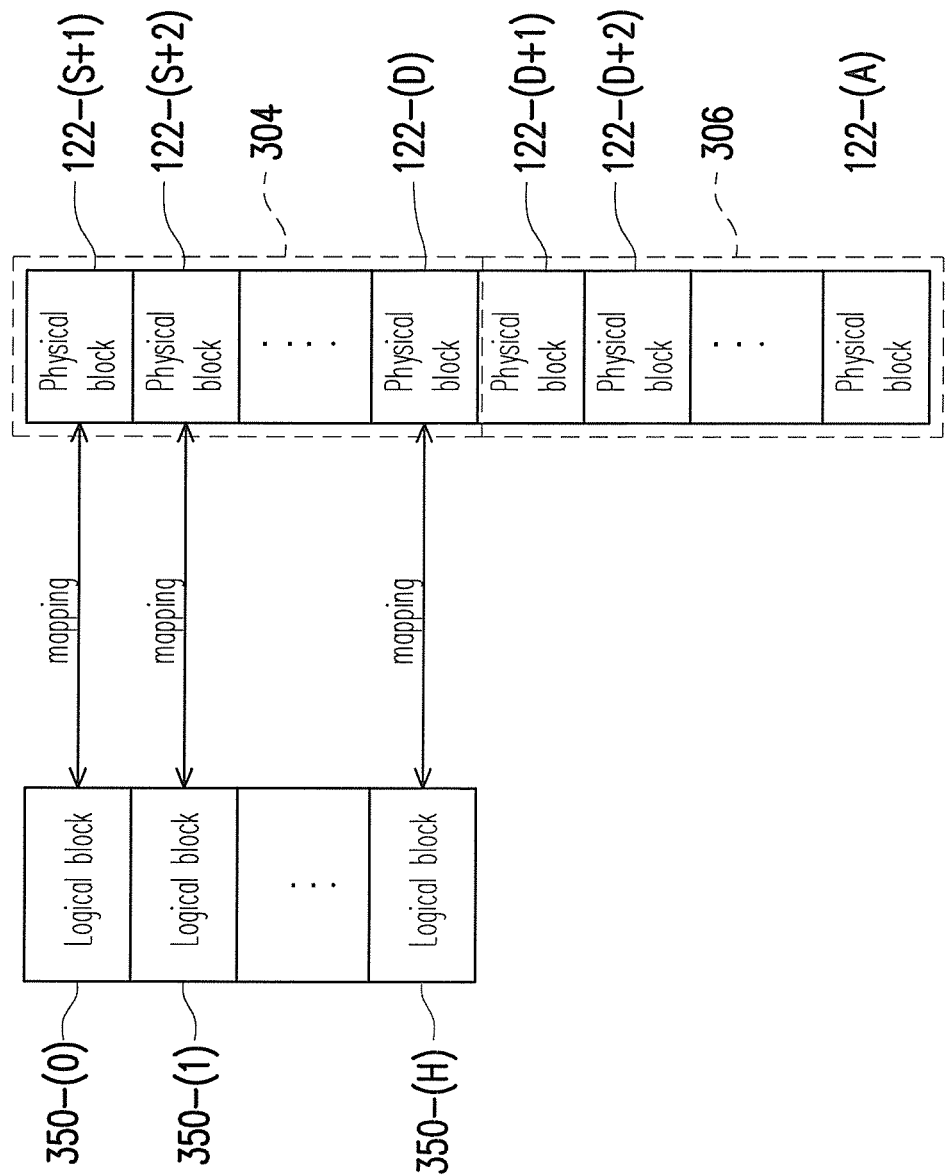
FIG. 4A and FIG. 4B are schematic diagrams illustrating operations of changing a mapping relationship of a bad logical block according to a first exemplary embodiment of the present invention.
Figure 4B:
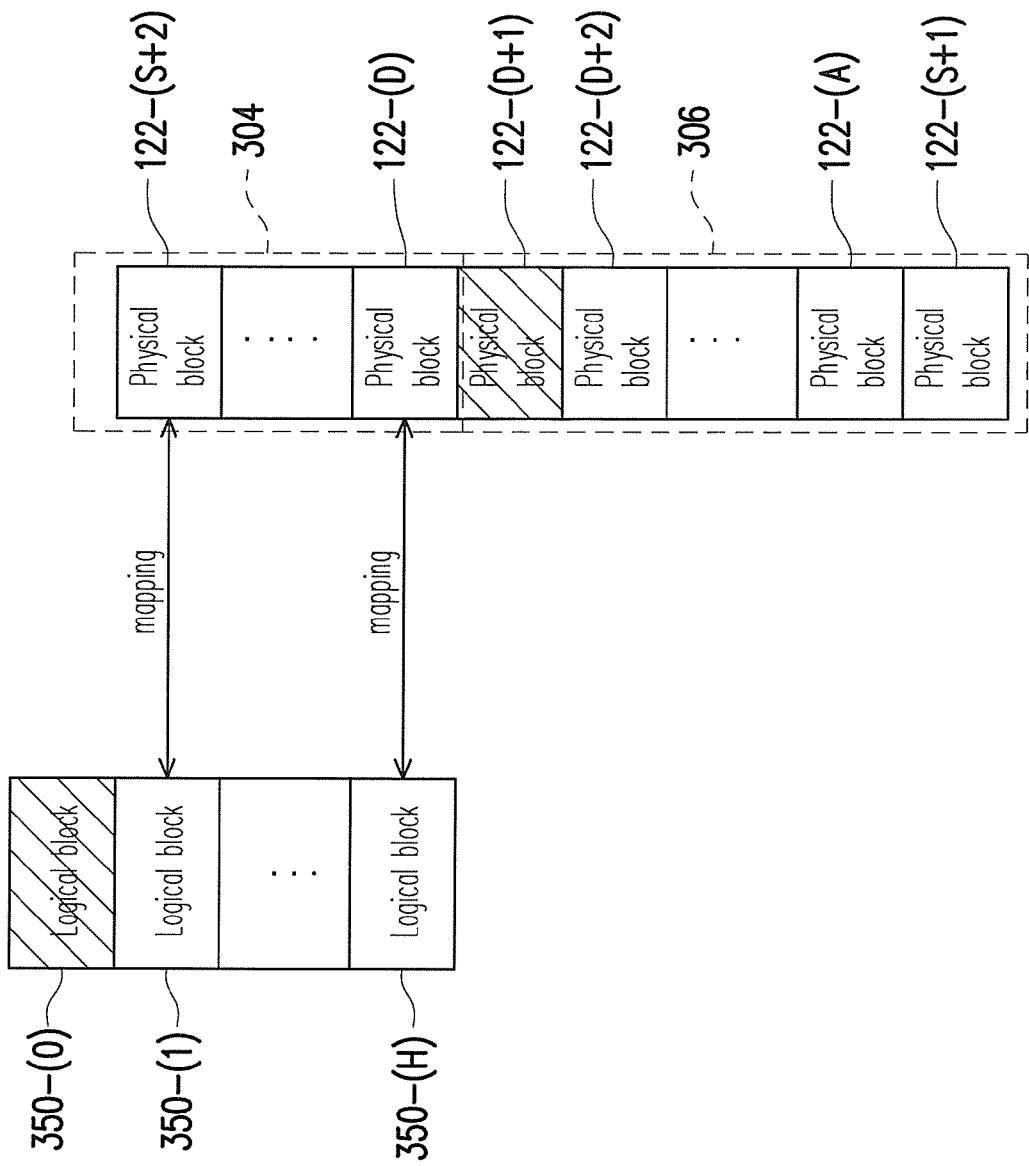

FIG. 4A and FIG. 4B are schematic diagrams illustrating operations of changing a mapping relationship of a bad logical block according to a first exemplary embodiment of the present invention.

Referring to FIG. 4A, the logical block 350-(0) is mapped to the physical block 122-(S+1), the logical block 350-(1) is mapped to the physical block 122-(S+2), and the logical block 350-(H) is mapped to the physical block 122-(D). Even though FIG. 4A does not show the mapping relationships of the other logical blocks, it is understood that the other logical blocks are similarly mapped to the physical blocks. Here, it is assumed that the host system 1000 has deleted data stored in the logical address of the logical block 350-(0), wherein the logical address of the logical block 350-(0) is recorded as invalid in the file allocation table and the data in the physical block 122-(S+1) is not deleted actually. In other words, the data stored in the logical address of the logical block 350-(0) is recognized as invalid by the host system 1000, but the data in the physical block 122-(S+1) still exists.

At this time, when the physical block 122-(D+1) becomes the bad physical block and there is no normal physical block in the replacement area 308 for replacing the physical block 122-(D+1), as shown in FIG. 4B, the memory management unit 204 recognizes the logical block 350-(0) as the deleted logical block and marks it as the bad logical block according to the received deleting records. Additionally, the memory management unit 204 erases the physical block (i.e. the physical block 122-(S+1)) mapped to the deleted logical block (i.e. the logical block 350-(0)) and links the physical block 122-(S+1) to the spare area. In other words, the physical block 122-(S+1) would becomes the physical block of the spare area 308, and then the physical block 122-(S+1) is used to substitute for the physical block in the data area 304 when the memory management unit 204 executes a host write command from the host system. Therefore, the number of the physical blocks in the spare area 306 is kept enough to make the memory management unit 204 to complete to writing data in the flash memory chip 106 in the alternate manner, thereby the lifespan of the flash memory storage device 100.

Figure 5:
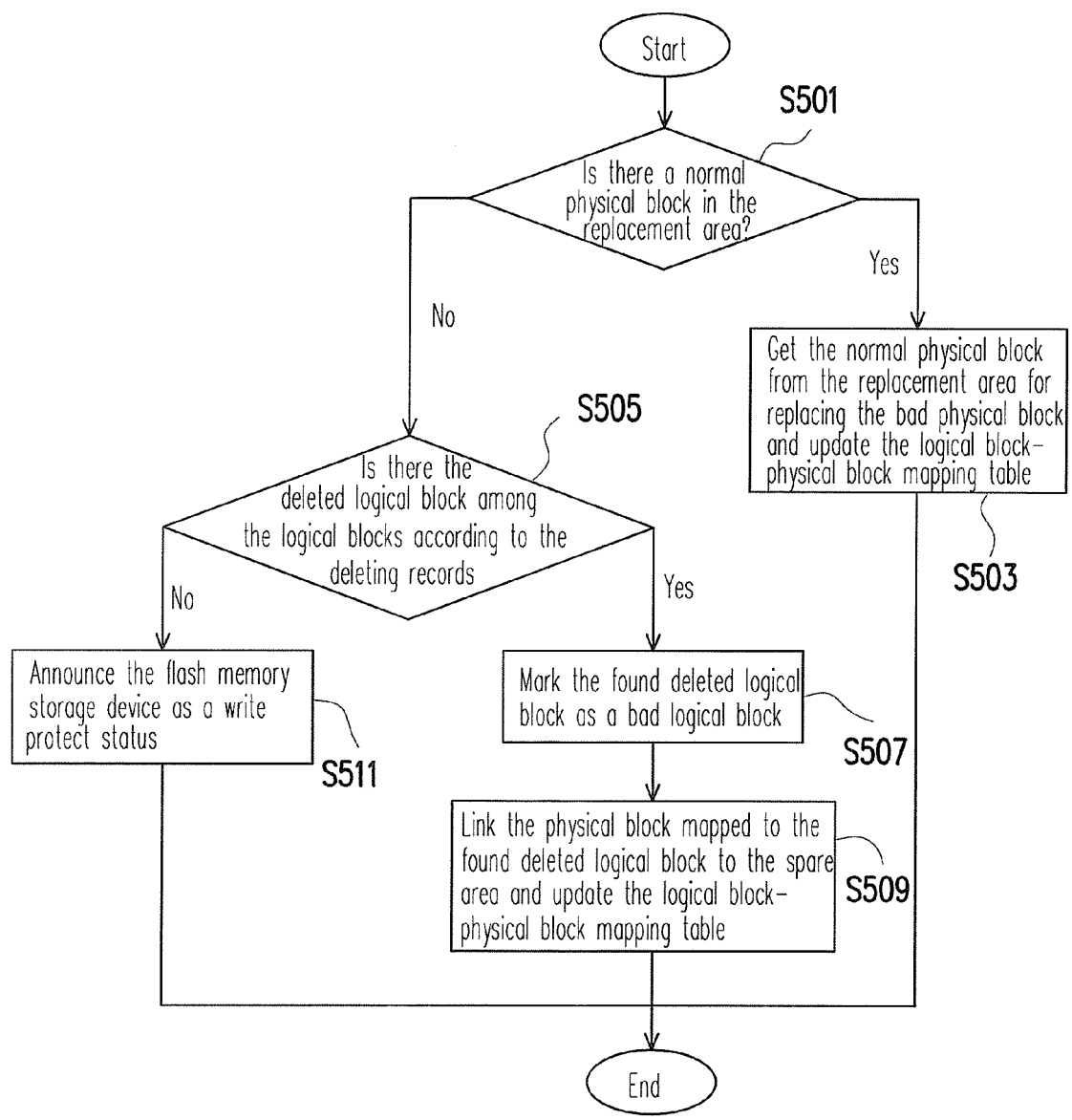
FIG. 5 is a flow chart illustrating a block management method according to a first exemplary embodiment of the present invention.

FIG. 5 is a flow chart illustrating a block management method according to a first exemplary embodiment of the present invention.

Referring to FIG. 5, when a physical block becomes bad, first, the memory management unit 204 of the flash memory controller 104 determines whether there is a normal physical block in the replacement area 308 in step S501. If there is the normal physical block in the replacement area 308, in step S503, the memory management unit 204 gets the normal physical block from the replacement area 308 for replacing the bad physical block and updates the logical block-physical block mapping table 260. And, the process shown in the FIG. 5 is terminated after step S503. It should be mentioned that the memory management unit 204 determines whether there is a normal physical block in the replacement area 308 in step 501 in the exemplary embodiment, however, the present invention is not limited thereto. In another embodiment of the present invention, the memory management unit 204 determines whether the number of the physical blocks in the replacement area 308 is smaller than a threshold in step S501, and step S503 is executed when the number of the physical blocks in the replacement area 308 is not smaller than the threshold and step S505 is executed when the number of the physical blocks in the replacement area 308 is smaller than the threshold.

If the memory management unit 204 determines that there is no any normal physical block in the replacement area 308, in step S505 the memory management unit 204 determinates whether there is the deleted logical block (such as the logical block 350-(0) shown in FIG. 4B) among the logical blocks according to the deleting records from the host system 1000.

If there is the deleted logical block, in step S507, the memory management unit 204 marks the found deleted logical block as the bad logical block, and in the step S509, the memory management unit 204 links the physical block mapped to the found deleted logical block to the spare area 306 and updates the logical block-physical block mapping table 260, wherein the found deleted logical block would not be mapped to any physical block in the logical block-physical block mapping table 260. And, the process shown in FIG. 5 is terminated after step S509.

If there is no any deleted logical block, in step S511, the memory management unit 204 announces that the flash memory storage device 100 is in a write protect status and the process shown in FIG. 5 is terminated.

Second Exemplary Embodiment

A flash memory storage device and a host system in the second exemplary embodiment essentially are similar to the flash memory storage device and the host system in the first exemplary embodiment, wherein the difference is a memory management unit in the second exemplary embodiment re-maps the logical addresses to the logical blocks to concentrate several deleted logical addresses into the same logical block. Here, FIGS. 1A, 1D and 3A are used for describing the second exemplary embodiment of the present invention.

In the first exemplary embodiment, when all the physical blocks in the spare area 306 become bad physical blocks or can not be used normally, and there is no any normal physical block in the replacement area 308, the flash memory controller 104 finds a delete logical block based on the deleting records. That is, the memory management unit 204 finds the deleted logical block among the logical blocks, wherein all the data stored in the logical addresses belonging to the deleted logical block has been deleted by the host system 1000. However, in some cases, though the memory management unit 204 does not find the deleted logical block, the size of the deleted logical addresses is the same or larger than the size of one logical block. That is, in these cases, the deleted logical addresses belong to several logical blocks, therefore, the memory management unit 204 does not find any deleted logical block. In the exemplary embodiment, the flash memory controller 104 re-maps the logical addresses to the logical blocks such that several deleted logical addresses are concentrated in the same logical block. Accordingly, the memory management unit 204 is capable of performing the adjust mechanism described in the first exemplary embodiment to make the physical block mapped to the deleted logical block which is not used actually by the host system 1000 as the physical block of the spare area 306.

Figure 6:
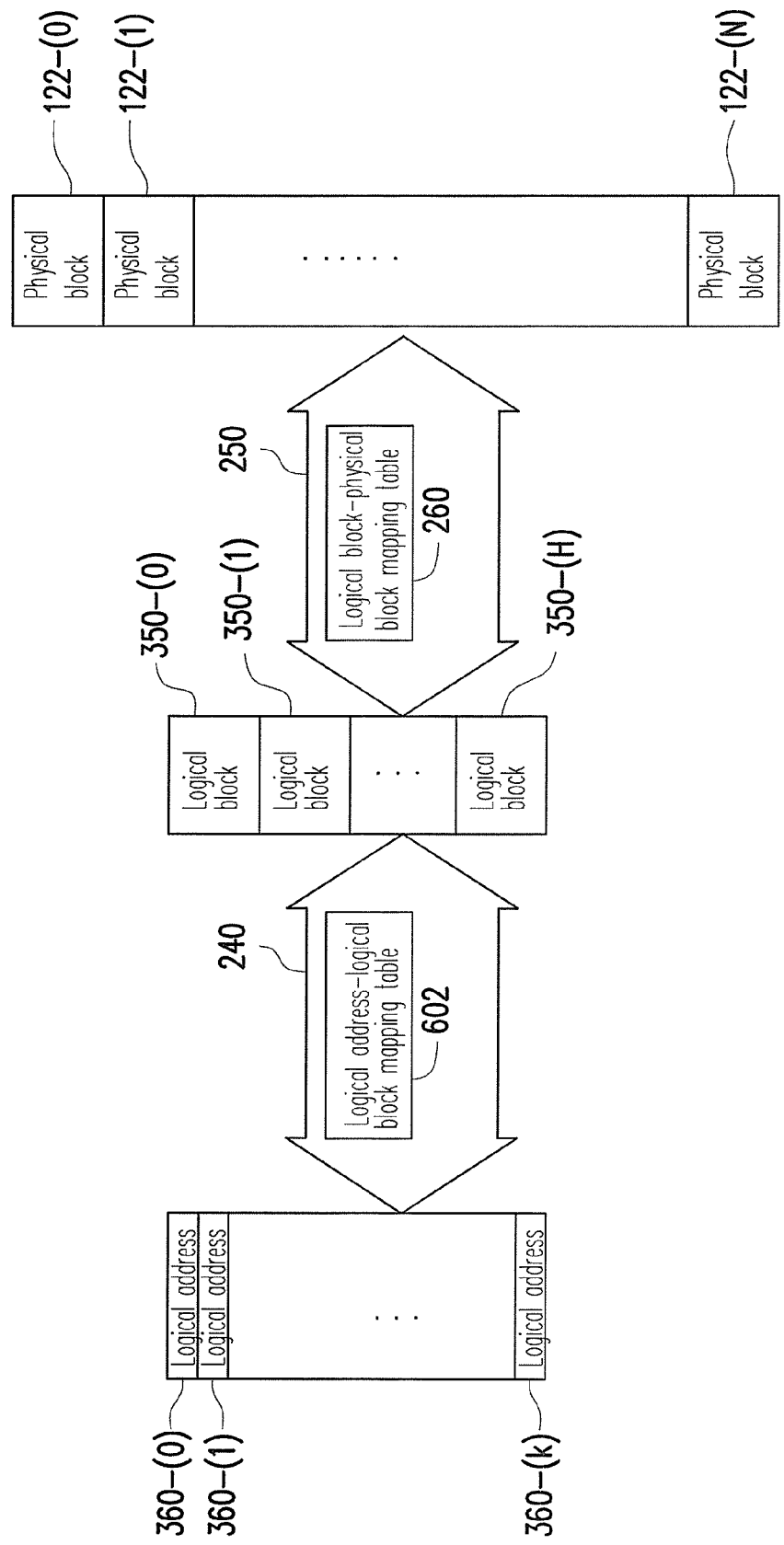
FIG. 6 is a schematic diagram illustrating operations of recording mapping relationships between logical blocks and physical blocks according to a second exemplary embodiment of the present invention.

FIG. 6 is a schematic diagram illustrating operations of recording mapping relationships between logical blocks and physical blocks according to a second exemplary embodiment of the present invention.

The mapping operation shown in FIG. 6 essentially is the same as the mapping operation shown in FIG. 3B, and only the difference between FIG. 6 and FIG. 3B will be explained. In FIG. 6, the first transform layer 240 includes a logical address-logical block mapping table 602. Instead of the operator unit 242 in the first exemplary embodiment, the logical address-logical block mapping table 602 is configured to record the mapping relationships between the logical addresses and the logical block. In detail, because the mapping relationship between the logical addresses and the logical blocks is re-mapped, the remapped mapping relationship does not be obtained by calculating simply. Therefore, in the exemplary embodiment of the present invention, the first transform layer 240 includes the logical address-logical block mapping table 602, and the memory management unit 204 updates the logical address-logical block mapping table 602 to record a result of the re-mapping.

Figure 7A:
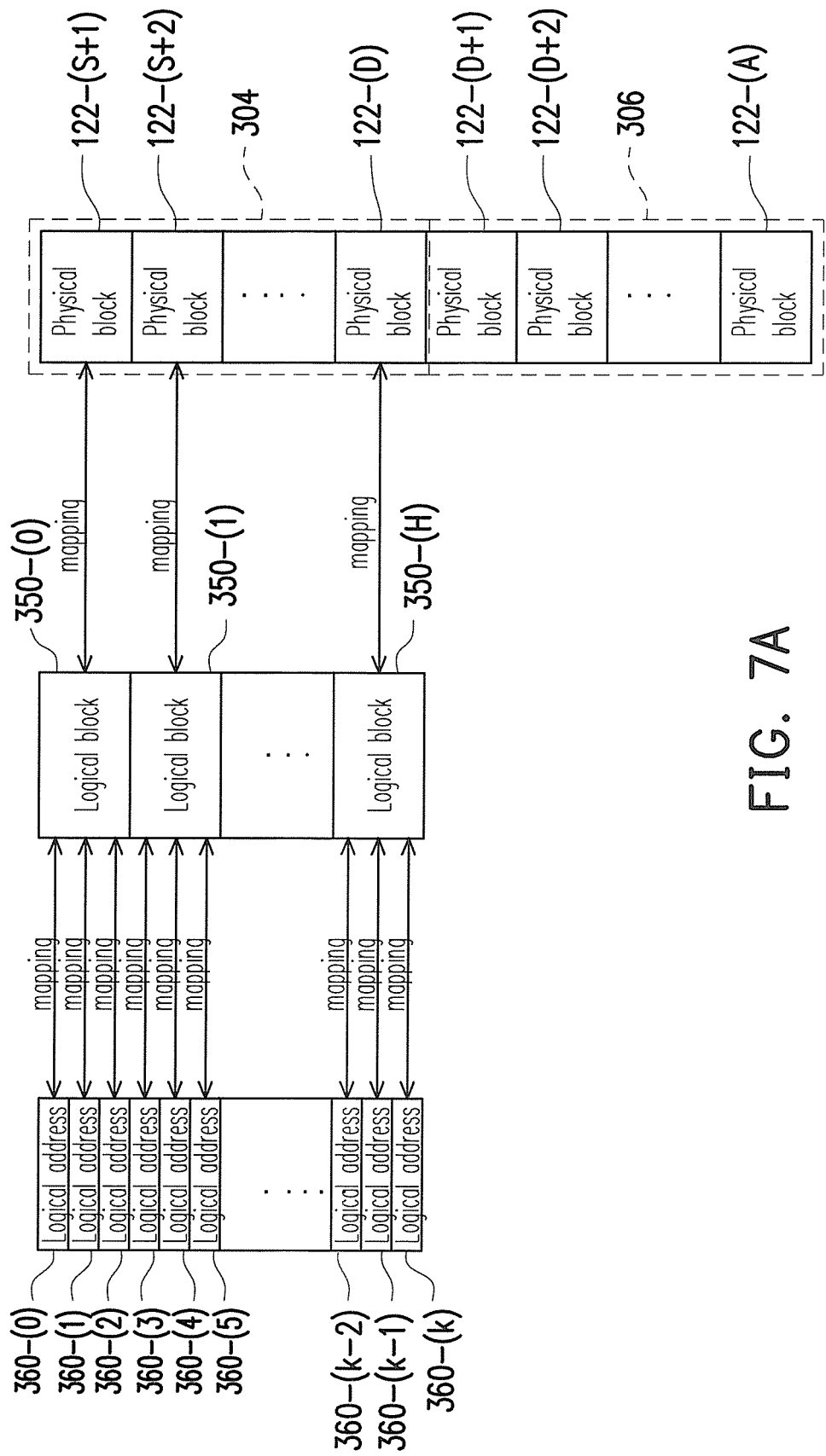
FIG. 7A and FIG. 7B are schematic diagrams illustrating operations of re-mapping logical addresses and changing a mapping relationship of a bad logical block according to a second exemplary embodiment of the present invention.
Figure 7B:
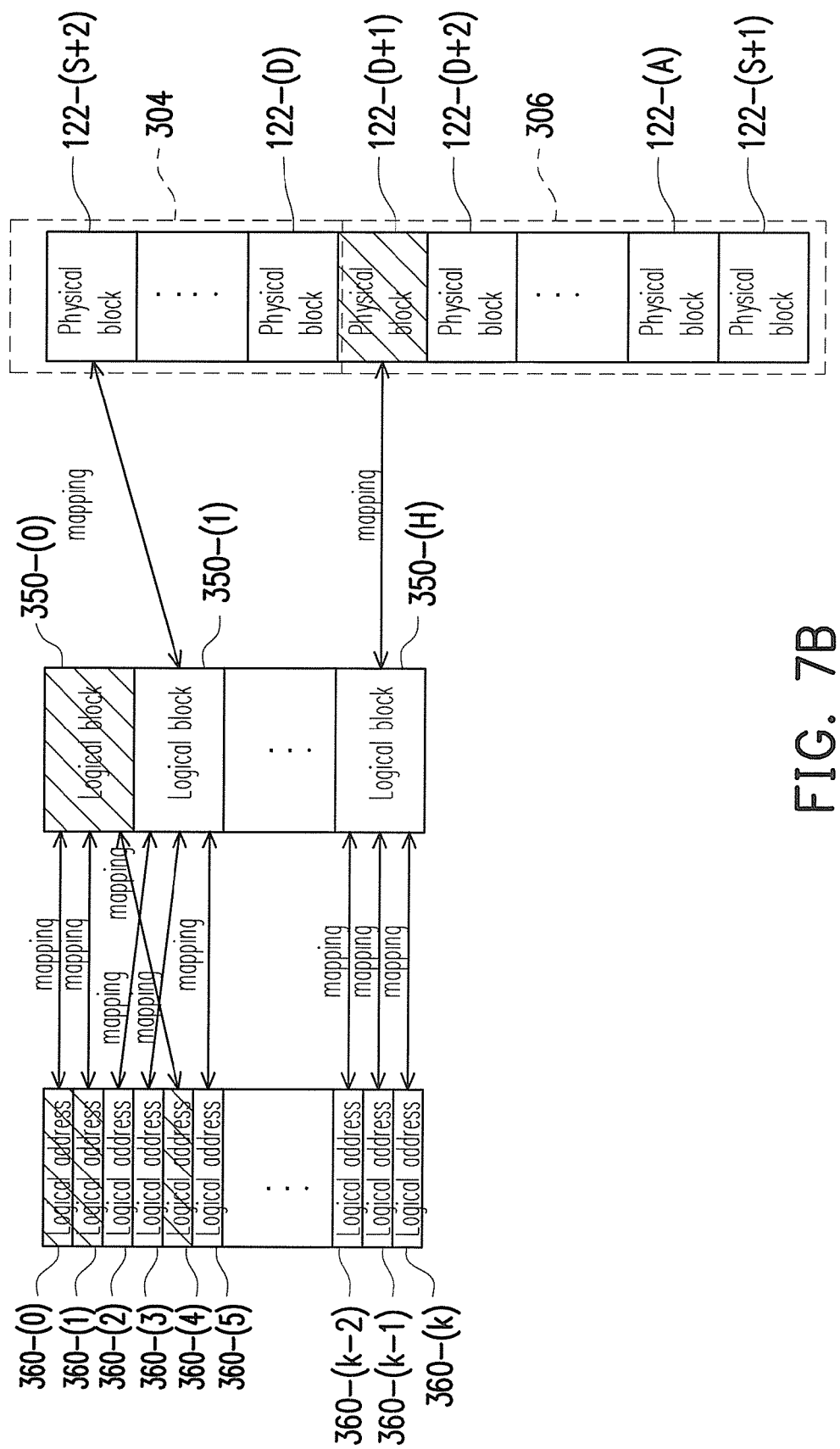

FIG. 7A and FIG. 7B are schematic diagrams illustrating operations of re-mapping logical addresses and changing a mapping relationship of a bad logical block according to a second exemplary embodiment of the present invention.

Referring to FIG. 7A, the logical addresses 360-(0)~360-(2) are mapped to the logical block 350-(0), the logical addresses 360-(3)~350-(5) are mapped to the physical block 350-(1), and the logical addresses 360-(K−2)~360-(K) are mapped to the logical block 350-(0). Even though FIG. 7A does not show the mapping relationships of the other logical addresses, it is understood that the other logical addresses are similarly mapped to the logical blocks. Additionally, the logical block 350-(0) is mapped to the physical block 122-(S+1), the logical block 350-(1) is mapped to the physical block 122-(S+2), and the logical block 350-(H) is mapped to the physical block 122-(D). Even though FIG. 7B does not show the mapping relationships of the other logical blocks, it is understood that the other logical blocks are similarly mapped to the physical blocks. Additionally, in the example, 3 logical addresses are mapped to one logical block, however, the present invention is not limited thereto, the number of logical addresses mapped to one logical block may be any suitable value.

In the example, it is assumed that the host system 1000 has deleted data stored in the logical address 360-(0), the logical address 360-(1) and the logical address 360-(4).

At this time, when the physical block 122-(D+1) becomes the bad physical block and there is no normal physical block in the replacement area 308 for replacing the physical block 122-(D+1), as shown in FIG. 7B, the memory management unit 204 recognizes the logical address 360-(0), the logical address 360-(1) and the logical address 360-(4) as the deleted logical addresses. In particular, the memory management unit 204 detects the size of the logical address 36040), the logical address 360-(1) and the logical address 360-(4) is the same as the size of one logical block and performs the re-mapping. For example, the memory management unit 204 re-maps the logical address 360-(0), the logical address 360-(1) and the logical address 360-(4) to the logical block 350-(0) and re-maps the logical address 360-(2), the logical address 360-(3) and the logical address 360-(5) to the logical block 350-(1). Accordingly, all the logical addresses mapped to the logical block 350-(0) are the deleted logical addresses, and the memory management unit 204 marks the logical address 360-(0), the logical address 360-(1) and the logical address 360-(4) as the bad logical addresses. And, the memory management unit 204 recognizes the logical block 350-(0) as the deleted logical block and marks the logical block 350-(0) as the bad logical block.

Additionally, similar to the first exemplary embodiment, the memory management unit 204 links the physical block 122-(S+1) mapped to the logical block 350-(0) to the spare area in the logical block-physical block mapping table 260. That is, the number of the physical blocks in the spare area 306 is kept enough to make the memory management unit 204 to complete to writing data in the flash memory chip 106 in the alternate manner, thereby the lifespan of the flash memory storage device 100.

Figure 8:
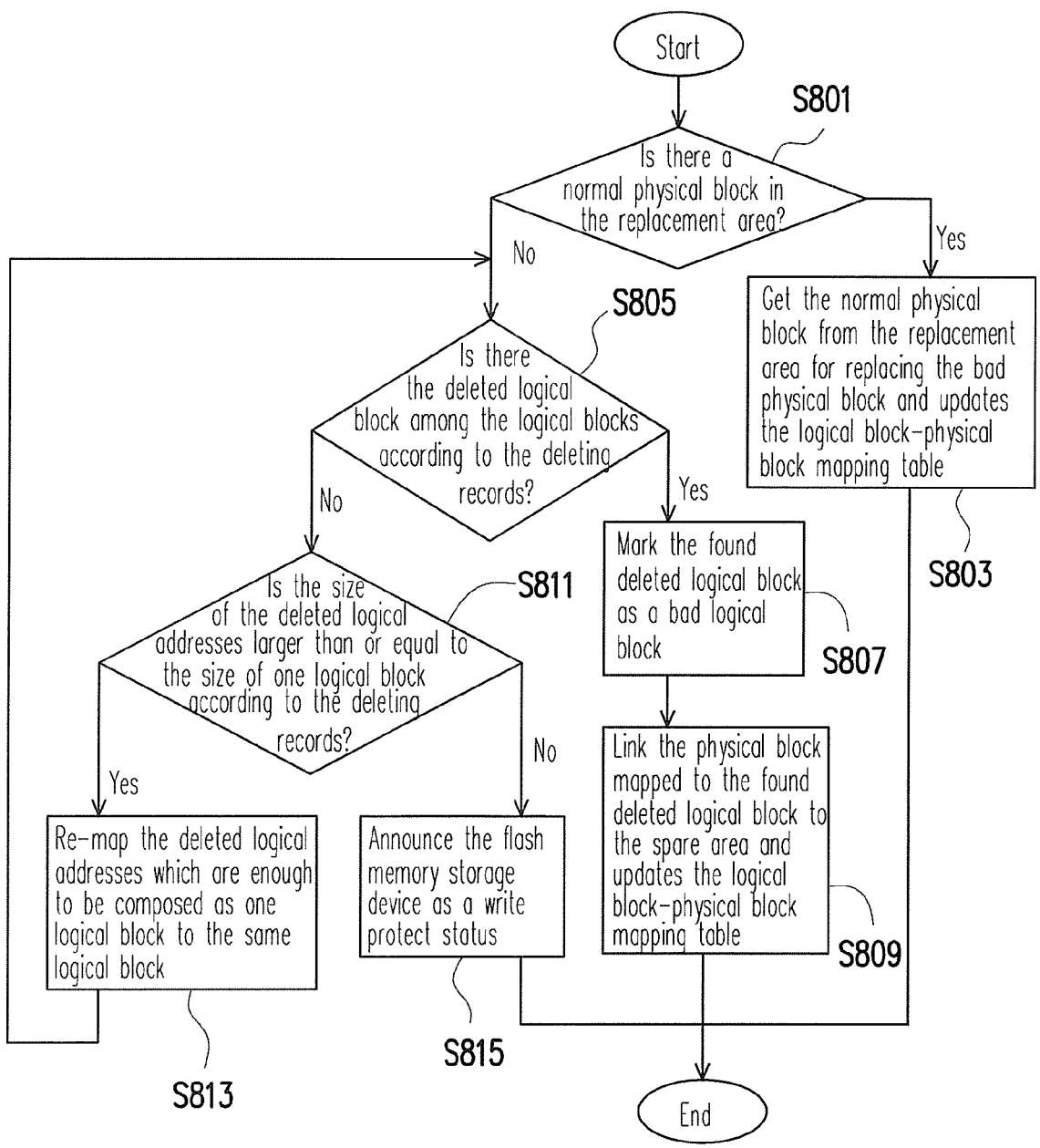
FIG. 8 is a flow chart illustrating a block management method according to a second exemplary embodiment of the present invention.

FIG. 8 is a flow chart illustrating a block management method according to a second exemplary embodiment of the present invention.

Referring to FIG. 8, when a physical block becomes bad, first, the memory management unit 204 of the flash memory controller 104 determines whether there is a normal physical block in the replacement area 308 in step S801. If there is the normal physical block in the replacement area 308, in step S803, the memory management unit 204 gets the normal physical block from the replacement area 308 for replacing the bad physical block and updates the logical block-physical block mapping table 260. And, the process shown in the FIG. 8 is terminated after step S803.

If the memory management unit 204 determines that there is no any normal physical block in the replacement area 308, in step S805 the memory management unit 204 determinates whether there is the deleted logical block among the logical blocks according to the deleting records from the host system 1000.

If there is the deleted logical block, in step S807, the memory management unit 204 marks the found deleted logical block as the bad logical block, and in the step S809, the memory management unit 204 links the physical block mapped to the found deleted logical block to the spare area 306 and updates the logical block-physical block mapping table 260, wherein the found deleted logical block would not be mapped to any physical block. And, the process shown in the FIG. 8 is terminated after step S809.

If the memory management unit 204 determines that there is no any deleted logical block among the logical blocks, in step S811 the memory management unit 204 determinates whether the size of the deleted logical addresses is larger than or equal to the size of one logical block according to the deleting records from the host system 1000.

If the size of the deleted logical addresses is larger than or equal to the size of one logical block, in step S813, the memory management unit 204 re-maps the deleted logical addresses which are enough to be composed as one logical block to the same logical block (such as the logical block 350-(0) shown in FIG. 7B) and step S805 is executed.

If the size of the deleted logical addresses is not larger than or equal to the size of one logical block (i.e. the deleted logical addresses are enough to be composed as one logical block), in step S815, the memory management unit 204 announces that the flash memory storage device 100 is in a write protect status and the process shown in FIG. 8 is terminated.

As described above, when the number of the physical blocks in the spare area is not enough to complete the data writing operation, in the above-mentioned block management method, a logical block is searched based on the deleting records from the host system, wherein all data stored in the found logical block is deleted by the host system. And, the physical block mapped to the found logical block is used as the physical block of the spare area, thereby the lifespan of the flash memory storage device can be effectively prolonged. Additionally, in the case where there is no any deleted logical block among the logical blocks, in the above-mentioned block management method, the mapping relationships between the logical addresses and the logical blocks is re-mapped, and the deleted logical block is generated, wherein all data stored in the deleted logical block is deleted by the host system. And, the physical block mapped to the deleted logical block is used as the physical block of the spare area, thereby the lifespan of the flash memory storage device can be effectively prolonged. The previously described exemplary embodiments of the present invention have many advantages, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A block management method for managing a plurality of physical blocks of a flash memory chip, the block management method comprising:

configuring a plurality of logical addresses;

mapping the logical addresses to a plurality of logical blocks, and mapping the logical blocks to the physical blocks;

configuring a logical block-physical block mapping table to record mapping relationships between the logical blocks and the physical blocks;

obtaining at least one deleting record from a host system, wherein the at least one deleting record has information about deleted logical addresses among the logical addresses and the host system marks data stored at the deleted logical addresses as invalid data in a file allocation table;

obtaining a deleted logical block among the logical blocks based on the at least one deleting record, wherein data stored at the deleted logical addresses of the deleted logical block is recognized as invalid data by the host system; and marking each of the logical address mapped to the deleted logical block as a bad logical address in the file allocation table, wherein according to the file allocation table, the bad logical addresses are not used for writing data anymore by the host system.

2. The block management method according to claim 1, further comprising:

logically grouping the physical blocks into at least a data area and a spare area, wherein each of the logical blocks is mapped to one of the physical blocks; and grouping the physical block mapped to the deleted logical block into the spare area.

3. The block management method according to claim 2, further comprising:

updating the logical block-physical block mapping table, wherein the deleted logical block is not mapped to any physical block.

4. The block management method according to claim 1, further comprising:

re-mapping the logical addresses to the logical blocks based on the at least one deleting record, wherein at least portion of the deleted logical addresses are re-mapped to one of the logical blocks and data stored at the at least portion of the deleted logical addresses is recognized as invalid by the host system; and updating the mapping relationships recorded in the logical block-physical block mapping table based on the re-mapping.

5. The block management method according to claim 4, further comprising:

logically grouping the physical blocks into at least a data area and a spare area, wherein each of the logical blocks is mapped to one of the physical blocks; and grouping the physical block mapped to the deleted logical block into the spare area.

6. The block management method according to claim 5, further comprising:

updating the logical block-physical block mapping table, wherein the deleted logical block is not mapped to any physical block.

7. The block management method according to claim 1, wherein the step of obtaining the at least one deleting record from the host system comprises:

receiving at least one trim command from the host system; and recognizing the at least one trim command to obtain the at least one deleting record.

8. A flash memory controller for managing a plurality of physical blocks of a flash memory chip, the flash memory controller comprising:

a microprocessor unit;

a flash memory interface unit, coupled to the microprocessor unit, and configured to connect to the flash memory chip; and a host interface unit, coupled to the microprocessor unit and configured to connect with a host system; and a memory management unit, coupled to the microprocessor unit and configured to configure a plurality of logical addresses, wherein the memory management unit maps the logical addresses to a plurality of logical blocks, maps the logical blocks to the physical blocks, and configures a logical block-physical block mapping table to record mapping relationships between the logical blocks and the physical blocks, wherein the memory management unit obtains at least one deleting record from the host system via the host interface unit, wherein the at least one deleting record has information about deleted logical addresses among the logical addresses and the host system marks data stored at the deleted logical addresses as invalid in a file allocation table, wherein the memory management unit obtains a deleted logical block among the logical blocks based on the at least one deleting record and marks each of the logical address mapped to the deleted logical block as a bad logical address in the file allocation table, wherein data stored at the deleted logical addresses of the deleted logical block is recognized as invalid by the host system and according to the file allocation table, the bad logical addresses are not used for writing data anymore by the host system.

9. The flash memory controller according to claim 8, wherein the memory management unit groups the physical blocks into at least a data area and a spare area, and each of the logical blocks is mapped to one of the physical blocks, wherein the memory management unit groups the physical block mapped to the deleted logical block into the spare area.

10. The flash memory controller according to claim 9, wherein the memory management unit updates the logical block-physical block mapping table, wherein the deleted logical block is not mapped to any physical block.

11. The flash memory controller according to claim 8, wherein the memory management unit re-maps the logical addresses to the logical blocks based on the at least one deleting record and updates the mapping relationships recorded in the logical block-physical block mapping table based on the re-mapping, wherein at least portion of the deleted logical addresses are re-mapped to one of the logical blocks and data stored at the at least portion of the deleted logical addresses is recognized as invalid by the host system.

12. The flash memory controller according to claim 11, wherein the memory management unit groups the physical blocks into at least a data area and a spare area, and each of the logical blocks is mapped to one of the physical blocks, wherein the memory management unit groups the physical block mapped to the deleted logical block into the spare area.

13. The flash memory controller according to claim 12, wherein the memory management unit updates the logical block-physical block mapping table, wherein the deleted logical block is not mapped to any physical block in the logical block-physical block mapping table.

14. The flash memory controller according to claim 8, wherein the host interface unit receives at least one trim command from the host system, and the memory management unit recognizes the at least one trim command to obtain the at least one deleting record.

15. A flash memory storage system, comprising:

a flash memory, having a plurality of physical blocks;

a connector, configured to connect with a host system;

a flash memory controller, coupled to the flash memory chip and the connector and configured to configure a plurality of logical addresses, wherein the flash memory controller maps the logical addresses to a plurality of logical blocks, maps the logical blocks to the physical blocks, and configures a logical block-physical block mapping table to record mapping relationships between the logical blocks and the physical blocks, wherein the flash memory controller obtains at least one deleting record from the host system via the connector, wherein the at least one deleting record has information about deleted logical addresses among the logical addresses and the host system marks data stored at the deleted logical addresses as invalid in a file allocation table, wherein the flash memory controller obtains a deleted logical block among the logical blocks based on the at least one deleting record and marks each of the logical address mapped to the deleted logical block as a bad logical address in the file allocation table, wherein data stored at the deleted logical addresses of the deleted logical block is recognized as invalid by the host system and according to the file allocation table, the bad logical addresses are not used for writing data any more by the host system.

16. The flash memory storage system according to claim 15, wherein the flash memory controller groups the physical blocks into at least a data area and a spare area, and each of the logical blocks is mapped to one of the physical blocks, wherein the flash memory controller groups the physical block mapped to the deleted logical block into the spare area.

17. The flash memory storage system according to claim 16, wherein the flash memory controller updates the logical block-physical block mapping table, wherein the deleted logical block is not mapped to any physical block in the logical block-physical block mapping table.

18. A block management method for managing a plurality of physical blocks of a flash memory chip, the block management method comprising:

configuring a plurality of logical addresses;

logically grouping the physical blocks into at least a data area and a spare area, wherein the physical blocks in the spare area are configured to substitute the physical blocks in the data area when a host write command is executed, and each of the logical addresses is mapped to one of the physical blocks in the data area;

marking at least one logical address mapped to the data area as at least one bad logical address in a file allocation table, and linking the physical block mapped to the at least one bad logical address to the spare area, wherein according to the file allocation table, the bad logical addresses are not used for writing data anymore by a host system; and obtaining at least one deleting record from the host system, wherein the at least one deleting record has information about at least one deleted logical address among the logical addresses and data stored at the at least one deleted logical address is recognized as invalid by the host system, wherein the at least one logical address marked as the at least one bad logical address is a logical address provided in the at least one deleting record.

* * * * *